United States Patent [19]
Matsui et al.

[11] 3,909,466
[45] Sept. 30, 1975

[54] ADHESIVE COMPOSITIONS OF NCO-TERMINATED PREPOLYMER AND RUBBER

[75] Inventors: Yutaka Matsui, Shizuoka; Seiji Kazama, Hyogo; Masamitsu Nakabayashi; Koji Kobayashi, both of Osaka, all of Japan

[73] Assignee: Takeda Chemical Industries, Ltd., Osaka, Japan

[22] Filed: June 28, 1972

[21] Appl. No.: 267,151

[30] Foreign Application Priority Data
July 5, 1971  Japan.............................. 46-49474

[52] U.S. Cl................ 260/3; 161/190; 161/213; 161/214; 161/217; 161/242; 161/253; 161/254; 161/255; 260/2 A; 260/2 BP; 260/75 NK; 260/75 NT; 260/77.5 AM; 260/77.5 AN; 260/709; 260/858; 260/859 R; 156/334; 156/338; 156/327

[51] Int. Cl.$^2$ C08L 75/06; C08L 75/08; C08L 15/00
[58] Field of Search. 260/3, 859 R, 75 NT, 77.5 AT

[56] References Cited
UNITED STATES PATENTS

| | | | |
|---|---|---|---|
| 3,522,199 | 7/1970 | Keberle et al................... | 260/859 R |
| 3,582,508 | 6/1971 | McIntosh............................... | 260/3 |
| 3,652,468 | 3/1972 | Schwab et al........................... | 260/3 |
| 3,663,513 | 5/1972 | Kazama et al.................. | 260/75 NT |

*Primary Examiner*—Wilbert J. Briggs, Sr.
*Attorney, Agent, or Firm*—Wenderoth, Lind & Ponack

[57] ABSTRACT

An adhesive composition having a long pot life and strong adhesive properties comprising (A) $\omega,\omega'$-diisocyanatodimethylcyclohexane, its polymer or NCO-terminated prepolymer and (B) natural rubber, synthetic rubber or a high molecular weight polyol.

17 Claims, No Drawings

ADHESIVE COMPOSITIONS OF NCO-TERMINATED PREPOLYMER AND RUBBER

This invention relates to novel adhesive compositions which have a long pot life and strong adhesive force.

Hitherto, there have been prepared various kinds of isocyanate-based adhesive compositions, each comprising an isocyanate component and a material soluble and fusible therewith such as a non-vulcanized rubber mixture or a hydroxy group-containing compound. The isocyanates which are generally used in the conventional adhesive compositions of the above type are classified into the following two groups, one being a relative high molecular compound having many isocyanato groups e.g. reaction product of 1 mole of trimethylolpropane and 3 moles of tolylenediisocyanate, and other being a polyisocyanate monomer having three or more isocyanato groups in the molecule, a typical example of which is tris-(p-isocyanatophenyl)-methane.

However, adhesive compositions using the latter polyisocyanate monomers are superior to those using the former high molecular isocyanates in view of compatibility with other resins, adhesive force, durability and heat-resistance. For this reason, the latter polyisocyanate monomers, especially tris-(p-isocyanatophenyl)-methane, tris-(4-isocyanophenyl)-thiophosphate and modified diphenylmethanediisocyanate are often used as isocyanate component of the adhesive compositions of this type.

But, an adhesive composition using the polyisocyanate monomer as mentioned above, especially, tris-(p-isocyanatophenyl)-methane, has only a very short pot life when the polyisocyanate is admixed with the main adhesive component such as resins (e.g. urea-formaldehyde resin) and rubbers, especially non-vulcanized rubbers, and thus its workability is very poor. For example, a mixture of tris-(p-isocyanatophenyl)-methane and polychloroprene rubber has a short pot life, and therefore its workability is very limited. Further, adhesive compositions of this type have also such a defect that their adhesive layer is so remarkably colored after adhesion that causes poor appearance of the substrates. Therefore, the adhesive composition of this type is limited in the use as an adhesive agent, for example, the composition is hardly useful for adhesion of light color materials such as light color shoes and bags, for which conventional adhesive compositions using the polyisocyanate monomer (e.g. tris-(p-isocyanatophenyl)-methane) are frequently used. In order to overcome this defect, as isocyanate component of the adhesive compositions, the use of tris-(4-isocyanophenyl)-thiophosphate has been proposed, but an adhesive composition this compound also has a defect in its remarkably short pot life, and thus it is substantially difficult to put the adhesive composition into practical use.

Under these circumstances, the present inventors have made extensive studies on isocyanate-based adhesives for the prupose of providing isocyanate-based adhesives having a sufficiently long pot life, a strong adhesive force and not being susceptible to coloring, and unexpectedly found that an adhesive composition using $\omega,\omega'$-diisocyanato-dimethylcyclohexane (abbreviated as $H_6XDI$) as an isocyanate component can exceptionally attain this purpose.

The present invention has been accomplished on the above unexpected finding.

Thus, the principal and essential object of the present invention is to provide isocyanate-based adhesive compositions having a sufficiently long pot life and a strong adhesive force and, not being susceptible to coloring. And, this object can be attained by using $\omega,\omega'$-diisocyanato-dimethylcyclohexane as an isocyanate component in an adhesive composition which comprises an isocyanate component and a material soluble and fusible therewith.

The adhesive composition of the present invention comprises the following component (A) and the component (B), the component (A) being $\omega,\omega'$-diisocyanato-dimethylcyclohexane, its polymer or its NCO-terminated prepolymer, and the component (B) being natural or synthetic rubber or a high molecular polyol.

$\omega,\omega'$-Diisocyanato-dimethylcyclohexane employable in the present invention includes $\omega,\omega'$-diisocyanato-1,3-dimethylcyclohexane $\omega,\omega'$-diisocyanato-1,4-dimethylcyclohexane and a mixture thereof. The polymer of $\omega,\omega'$-diisocyanato-dimethylcyclohexane includes all compounds having a urethodione ring or isocyanurate ring in their molecules and NCO-content of about 5 to about 35, more preferably about 10 to about 25%, which are prepared by polymerization of the isocyanate after a conventional manner such as polymerization of $H_6XDI$ with the use of a basic catalyst (e.g. trimethylbenzylammonium hydroxide). The above polymerization reaction is usually conducted at about 0° to about 150°C in a suitable inert solvent. The reaction time varies with a kind of catalyst to be used, but usually about 3 to 20 hours. The solvent employable in the reaction includes esters (e.g. ethyl acetate, butylacetate), ethers (e.g. diisopropyl ether) and ketones (e.g. methyl ethyl ketone).

Typical examples of the polymers are a dimer of $H_6XDI$ and a trimer of $H_6XDI$. Namely, the predominant product of the polymerization reaction is a dimer of $H_6XDI$, a trimer of $H_6XDI$ or a mixture thereof, but when the reaction conditions are rather mild, the product contains also unreacted $H_6XDI$, and when the reaction conditions are rather severe, the product contains also higher polymerized polymers of $H_6XDI$. All of these mixtures, however, can substantially equally be used in the present invention.

But, when the polymer contains unreacted $H_6XDI$, the unreacted diisocyanate may be removed by a suitable means (e.g. extraction, distillation), if necessary.

The NCO-terminated prepolymer of $H_6XDI$ is that prepared by reacting an excess amount of $H_6XDI$ with a active hydrogen-containing compound.

The active hydrogen-containing compound, which is used for the reaction with $H_6XDI$ is preferably that having a molecular weight of about 60 to about 500, particularly about 350 to about 400, and is exemplified by saturated or unsaturated glycols such as aliphatic glycols having up to 12 carbon atoms (e.g. ethylene glycol, diethylene glycol, 1,2-and 1,3-propylene glycol, 1,2-, 1,3-and 1,4-butylene glycol, 2,2-dimethyl-1,3-propylene glycol, 1,6-hexane diol, 2,2,4-tri-methyl-1,3-pentane-diol), alicyclic glycols having up to 20 carbon atoms [e.g. 2,2,4,4-tetramethyl cyclobutane diol, 1,3-cyclopentane diol, 1,4-cyclohexane diol, 1,4-bis(hydroxymethyl)cyclohexane, methylene-bis(cyclohexanol)] and aromatic glycols having up to 20 carbon atoms [e.g. 1,4-phenylene-bis($\beta$-hydroxyethyl)ether, isopropylidene-bis($\beta$-hydroxyethyl phenyl)ether]; polyols having 3 to 8 OH groups per molecule, such as triol having up to 12 carbon atoms (e.g. trimethylolpropane, glycerol, hexanetriol), tetraol having up to 14 carbon atoms (e.g. pentaerythritol, diglycerol), sorbitol and sucrose; primary amines which may be substituted by a lower alkoxy group (e.g. methoxy, ethoxy, propoxy) such as aliphatic primary amines having up to 20 carbon atoms (e.g. n-butylamine), alicyclic primary amines having up to 20 carbon atoms (e.g. cyclohexylamine), diamines such as aliphatic diamines having up to 20 carbon atoms (e.g. ethylenediamine, 1,6-hexamethylenediamine), alicyclic diamines having up to 20 carbon atoms (e.g. 1,3-diaminomethylcyclohexane, isophoronediamine) and aromatic diamines having up to 20 carbon atoms (e.g. phenylenediamine, 4,4'-diaminodiphenylmethane); mono-aminoalcohols having up to 20 carbon atoms (e.g. ethanolamine, diethanolamine); carboxylic acids such as aliphatic mono-and diaminocarboxylic acid, alicyclic mono-diaminocarboxylic acid, aliphatic hydroxy carboxylic acid, aromatic hydroxy carboxylic acids, mercapto acids, aliphatic di- or tricarboxylic acids having up to 20 carbon atoms (e.g. adipic acid, citric acid).

The NCO-terminated prepolymer of the present invention is prepared, as briefly stated above, by reacting ω,ω'-diisocyanato-dimethylcyclohexane or its polymer as mentioned above with the active hydrogen-containing compound or an optional mixture thereof in such an amount that a ratio of NCO groups/OH groups is not lower than about 1.5, practically about 1.5 to about 10 more preferably about 1.8 to about 3. When used in a too large amount of the diisocyanate, some of it remains unreacted. In such a case, it is desirable to remove the unreacted diisocyanate by a suitable means (e.g. extraction or distillation), but even when this purification procedure is not conducted, the remaining unreacted diisocyanate gives no bad influence upon the adhesive force when the resultant as such is used as one of the components of the adhesive composition.

The afore-mentioned reaction is usually conducted at about 0° to about 150°C in the absence or presence of an inert solvent.

In order to accelerate the reaction, organic metal compounds (e.g. stannous octoate, ferric acetylacetonate, lead naphthenate) or tertiary amines (e.g. triethylene diamine, N-methylmorpholine) may be used in this reaction, and gellation inhibitors (e.g. benzoyl chloride) may also be used.

In the above reaction, allophanate linkages or/and biuret linkages can be produced by conducting the reaction at a higher temperature than that mentioned above, or by using a catalyst such as stannous octoate.

The inert solvent employable in the reaction includes, for example, aromatic hydrocarbons (e.g. benzene, toluene xylene), halogenated hydrocarbons (e.g. methylene chloride, ethylene chloride, trichloroethane, chlorobenzene), esters (e.g. ethyl acetate, butyl acetate, 2-ethoxyethyl acetate), ketones (e.g. acetone, methyl ethyl ketone, cyclohexanone), ethers (e.g. diisopropyl ether, tetrahydrofuran, dioxane), dimethyl formamide and dimethyl acetamide.

The natural rubber may be any ones which are produced in any place of origin and time.

The synthetic rubber of the component (B) is a polymer or copolymer which is prepared by polymerization or copolymerization of a diene-type compound having a conjugated double bond and having 4 to 10 carbon atoms in its molecule. The diene compound includes, for example, butadiene, isoprene, chloroprene. The monomer copolymerizable with the diene compound is that having a double bond and 4 to 16 carbon atoms per molecule, which includes, for example, styrene, acrylonitrile, butylene, isobutylene. The molecular weight of the synthetic rubber is about 20,000 to about 200,000.

As the synthetic rubber of the component (B), any ones can equally be used regardless of their crystallinity, crystal structure, stereo structure, ect. The typical examples of the synthetic rubbers are styrene-butadiene rubber, butadiene rubber and nitrile rubber, chloroprene rubber, isoprene rubber and butyl rubber. Moreover, the synthetic rubber of the component (B) includes also other synthetic rubbers such as urethane rubbers, which are prepared by reacting isocyanate compound (e.g. diphenylmethane-4,4'-diisocyanate) with polyester polyol or polyether polyol such as those mentioned hereinafter after per se conventional means.

The high molecular polyol of the component (B) is that having a molecular weight of about 400 to about 50,000, more preferably about 5,000 to about 30,000 and is exemplified by polyester polyols, polyether polyols, polyetherpolyester polyols and a mixture thereof. The polyester polyols include for example, polyester polyols which are prepared by reacting one or more of the glycols or the polyols having 3 to 8 OH groups per molecule as mentioned above with one or more of dicarboxylic acids as saturated aliphatic ones (e.g. adipic acid, sebacic acid), unsaturated aliphatic ones (e.g. maleic acid, fumaric acid) and aromatic ones (e.g. phthalic acid, isophthalic acid). The polyether polyols includes, for example, polyether polyols which are prepared by subjecting cyclic ethers such as ethylene oxide, propylene oxide, epichlorohydrin, oxacyclobutane, substituted oxacyclobutane, tetrahydrofuran to ring-opening polymerization or compolymerization in the presence or absence of the glycol or the polyols having 3 to 8 OH groups per molecule as mentioned above. The polyether polyester polyols are prepared by reacting one or more of the glycols or the polyols having 3 to 8 OH groups per molecule as mentioned above with cyclic ether is mentioned above and aromatic or unsaturated aliphtic dicarboxylic acid anhydride such as phthalic anhydride, and maleic anhydride.

Detailed reaction techniques or conditions for the production of the polyols may be any of conventional ones described in prior publications (e.g. "High Polymers Vol. XVI Polyurethanes: Chemistry and Technology Part I" (1962) by J. H. Saunders and K. C. Frisch, published by Interscience Publishers, New York, N.Y., U.S. Pat. Nos. 2890208, 2977885, 2933478, etc.).

Among the natural or synthetic rubbers and the high molecular polyols, the synthetic rubbers, especially chloroprene rubber is practically most preferable as the component (B). The synthetic rubbers of the component (B) may be incorporated with various additives such as antioxidants, reinforcing materials (e.g. magnesium oxide, zinc oxide, carbon black, stearic acid), solvents (e.g. toluene, methyl ethyl ketone, process oil) and materials adjusting viscosity (e.g. chlorinated rubber), etc.

The adhesive composition of the present invention is prepared by mixing the component (A) with the component (B) in such a ratio as mentioned hereinafter. In this mixing process, any inert organic solvent mentioned above may concomitantly be used in order to adjust the solid content and/or the NCO-content of the composition.

The adhesive composition of the present invention comprises generally 1 weight part of the component (A) and 10 to 200 weight parts, more preferably 15 to 100 weight parts of the component (B). The present adhesive compositions may be used as they are, but, if necessary, they may be used after dilution with such an inert organic solvent as mentioned above. In this case, the total solid content of the composition is generally adjusted to about 5 to 70, more preferably about 10 to about 50 weight %. In order further to enhance stability of the composition, various additives such as antioxidants, ultraviolet ray absorbers, hydrolysis inhibitors and antifungal agents may be further added to the composition in an amount not exceeding about 5 weight % of the solid content thereof.

The thus prepared adhesive compositions of the present invention have a sufficiently long pot life and strong adhesive force. Further, if desired, the pot life may be optionally shortened by using a suitable catalyst (e.g. N-methylmorpholine, stannous octoate, lead naphthenate) in an amount of about 0.1 to about 3.0%, and the pot life thus shortened ranges from a few seconds to several ten hours due to the catalyst amount. Further, even after the adhesive composition of the present invention is applied to substrates, there is not observed "coloring" which has been the most serious drawback in adhesive compositions using conventioned organic aromatic isocyanate, and a strong adhesive force attained by the present adhesive compositions is maintained for a long period of time.

The adhesive compositions of the present invention are suitable for adhering the same or different kinds of solid substances such as for adhesion of rubber to rubber, adhesion to each other of leather, fiber, various kinds of synthetic resins, metal, glass and paper and adhesion of fabric to fabric.

When the thus prepared present composition is used as an adhesive agent, the technique for the adhesion may be any of conventional ones. For example, a substrate is immersed into the composition, or composition is applied on the surface of a substrate, if necessary, followed by removing a part or all of the solvent used and drying, and thus treated substrate is part on another substrate or thus treated substrates are piled on each other, followed by keeping standing at room temperature under atmospheric pressure or, if necessary, heating preferably under elevated pressure.

The following experiments are given to illustrate this invention and should by no means be construed as limiting the scope of this invention. The term "part(s)" in the following experiments is based on weight.

EXPERIMENT (1)

[I]. Preparation of component (A)

i. A reaction vessel equipped with a thermometer, a nitrogen gas inlet, a reflux-condenser and a stirrer is charged with 24 parts of ethyl acetate and 58.2 parts of $\omega,\omega'$-diisocyanato-1,3-dimethylcyclohexane. Then, to the solution is added dropwise over 1 hour 13.4 parts of trimethylolpropane at 50° to 70°C with stirring under dry nitrogen gas stream, followed by allowing to react at 70°C for further 2 hours. After cooling the reaction system at 20°C, 262 parts of methylene chloride is added. This procedure gives a polyurethane polyisocyanate of solid content of 20% and an NCO-content of 3.52%. This product is referred to as component (A)-(i).

ii. A similar reaction vessel to that used in Experiment [I]-(i) is charged with 53 parts of ethyl acetate and 38.8 parts of $\omega,\omega'$-diisocyanato-1,3-dimethylcyclohexane. Then, to the solution is added dropwise over 1 hour 14.2 parts of $\omega,\omega'$-diaminomethylcyclohexane at 10° to 20°C with stirring under dry nitrogen gas stream, followed by allowing to react at 70°C for further 2 hours. After cooling the reaction system at 20°C, 159 parts of methylene chloride is added. This procedure gives a polyureapolyisocyanate of solid content of 20% and an NCO-content of 3.2%. This product is referred to as component (A)-(ii).

iii. A similar reaction vessel to that used in Experiment [I]-(i) is charged with 15 parts of ethyl acetate, 85 parts of $\omega,\omega'$-diisocyanato-1,3-dimethylcyclohexane and 0.1 part of trimethylbenzylammonium hydroxide, followed by allowing to react at 45°C for 10 hours. The resulting reaction mixture is extracted 6 times with a mixture of benzene and n-hexane (3:7), and to the extract is added ethyl acetate in order to adjust a solid content thereof to 65 %. This procedure gives a reaction product of an NCO-content of 14% and viscosity of Gardner-D. To 100 parts of the product is added 225 parts of methylene chloride, and the mixture is stirred to give an isocyanate polymer of solid content of 20% and an NCO-content of 4.3%, which chiefly consists of $H_6XDI$ trimer. This product is referred to as component (A)-(iii). iv. A similar reaction vessel to that used in Experiment [I]-(i) is charged with 13.8 parts of ethyl acetate, 142.2 parts of methylene chloride and 38.8 parts of $\omega,\omega'$-diisocyanato-1,3-dimethylcyclohexane. The solution is stirred at 20°C for 1 hour under dry nitrogen gas stream, whereby a diisocyanate solution of solid content of 20% and an NCOcontent of 8.64%. This product is referred to as a component (A)-(iv).

v. As controls, the following components (C)-(i) to (iii) are prepared by the same manner as Experiment [I]-(i) except that the following diisocyanates are used in place of $\omega,\omega'$-diisocyanato-1,3-dimethylcyclohexane:

| Component | Diisocyanate |
| --- | --- |
| (C)-(i) | tolylene diisocyanate (2,4-isomer/2,6-isomer=80/20) |
| (C)-(ii) | xylylene diisocyanate |
| (C)-(iii) | hexamethylene diisocyanate |

[II] Preparation of adhesive compositions

1. The adhesive compositions of the present invention are prepared by admixing the above components (A) with the following component (B) in such a ratio as described in the following Table (I).

The component (B): (a mixture consisting of the following components):

| | |
| --- | --- |
| Neoprene AD (trade name of chloroprene rubber manufactured by du Pont de Nemours & Co. Inc. U.S.A. | 100 |
| Magnesium oxide | 4 |
| Chlorinated rubber | 25 |
| Antioxidant | 2 |
| Zinc oxide | 5 |
| Methyl ethyl ketone | 325 |
| Toluene | 77 |
| | (parts) |

Table (I)

| Adhesive composition | Component (part) | | | | (B) | Constants of Compositions | |
|---|---|---|---|---|---|---|---|
| | (A)-(i) | (A)-(ii) | (A)-(iii) | (A)-(iv) | | Solid content (%) | Viscosity (25°C) c.p.s. |
| 1-(i) | 5 | | | | 100 | 25 | 6,500 |
| 2-(i) | | 5 | | | 100 | 25 | 6,480 |
| 3-(i) | | | 5 | | 100 | 25 | 6,250 |
| 4-(i) | | | | 5 | 100 | 25 | 6,300 |

2. As controls, the following adhesive compositions of Table (II) are prepared by the same manner as in Experiment (II) except that the above components (C)-(i) to (iii) and the following isocyanates are used in place of the components (A)-(i) to (iv):

The isocyanates used are: tris-(p-isocyanatophenyl)methane or tris-(4-isocyanophenyl)-thiophosphate.

Table (II)

| Controlled composition | Component (part) | | | | | (B) | Constants of composition | |
|---|---|---|---|---|---|---|---|---|
| | (C)-(i) | (C)-(ii) | (C)-(iii) | TIM* | TIT** | | Solid content (%) | Viscosity c.p.s (25°C) |
| 1 | 5 | | | | | 100 | 25 | 6,500 |
| 2 | | 5 | | | | 100 | 25 | 6,300 |
| 3 | | | 5 | | | 100 | 25 | 6,300 |
| 4 | | | | 5 | | 100 | 25 | 6,200 |
| 5 | | | | | 5 | 100 | 25 | 6,200 |

Remarks:
*Tris-(p-isocyanato-phenyl)-methane
**Tris-(4-isocyanophenyl)-thiophosphate

[III] Comparison of pot life

To the adhesive compositions prepared in [II] are added various amounts of N-methylmorpholine in such a ratio as described in the following Table (III) in order to control the pot life.

The comparison of the adhesive compositions mentioned above in their pot lives is conducted by measuring a time required for making the compositions show no longer fluidity. Results are described in the following Table (III).

Table (III)

| Adhesive composition | Amount of catalyst (N-methylmorpholine) (weight %) | Viscosity c.p.s.(25°C) | Pot life (hour) |
|---|---|---|---|
| 1-(i) | 0 | 6,500 | 20 |
| 1-(ii) | 0.5 | 6,300 | 4 |
| 1-(iii) | 1.0 | 6,450 | 1.5 |
| 1-(iv) | 2.0 | 6,200 | 0.7 |
| 1-(v) | 3.0 | 6,400 | 0.1 |
| 2-(i) | 0 | 6,480 | 25 |
| 2-(ii) | 1.0 | 6,300 | 1.5 |
| 3-(i) | 0 | 6,250 | 20 |
| 3-(ii) | 1.0 | 6,550 | 1.0 |
| 4-(i) | 0 | 6,300 | 40 |
| 4-(ii) | 1.0 | 6,500 | 2.0 |
| Controlled composition | | | |
| 1 | — | 6,500 | 4 |
| 2 | — | 6,300 | 6 |
| 3 | — | 6,300 | 15 |
| 4 | — | 6,300 | 0.8 |
| 5 | — | 6,450 | 0.8 |

As clear from the above data, the pot life of the adhesive compositions of the present invention is remarkably longer than that of the controlled compositions and, moreover, can optionally be controlled i.e. shortened by using a catalyst such as N-methylmorpholine.

On the contrary, the pot life of controlled compositions, especially the composition 4 and 5, are remarkably short.

[IV] Test of adhesive force

1. Adhesive force of the above adhesive compositions is tested by the following method:

The surface of a sole made of a mixture of natural rubber and butadiene-styrene rubber is roughed by sanding. One of the above adhesive composition is coated on the thus treated surface of the sole and the surface of a polyvinyl chloride resin sheet which is previously treated with a primer, followed by keeping at room temperature for 30 minutes. Then, the thus treated sole and a polyvinyl chloride resin sheet are piled in such a manner that the coated surfaces are contacted with each other, followed by pressing. The piled material is pressed under pressure of 3.5kg/cm² for 5 minutes, followed by keeping at room temperature for 1 week. The resultant is cut into a test piece (100 × 25 mm), and on thus prepared test piece, T-peel test is conducted according to a test method of ASTM D1876-69 by using a Tensilon testing machine at a loading rate of 50mm/min. Results are described in the following Table (IV).

In addition, the piled materials prepared in the above procedure are stored at room temperature for 1 month in order to observe their coloring. Results are also described in the following Table (IV).

Table (IV)

| Adhesive Composition | 25°C | Type of destruction | 80°C | Type of destruction | Coloring after 1 month |
|---|---|---|---|---|---|
| 1-(i) | 11.32 | G | 3.00 | C | (—) |
| A—(ii) | 11.10 | G | 3.00 | C | (—) |
| 1-(iii) | 9.35 | G | 3.50 | C | (—) |
| 1-(iv) | 11.00 | G | 3.50 | C | (—) |
| 1-(v) | 9.00 | G | 3.30 | C | (—) |
| 2-(i) | 10.50 | G | 5.41 | C | (—) |
| 2-(ii) | 10.00 | G | 5.31 | C | (—) |
| 3-(i) | 11.00 | G | 5.60 | C | (—) |
| 3-(ii) | 9.50 | G | 5.51 | C | (—) |
| 4-(i) | 9.50 | G | 2.70 | A | (—) |
| 4-(ii) | 9.35 | G | 2.50 | A | (—) |
| Controlled composition | | | | | |
| 1 | 3.0 | A | — | — | Yellowish brown |
| 2 | 5.0 | A | — | — | (—) |
| 3 | 3.0 | A | — | — | (—) |
| 4 | 10.50 | G | 5.41 | C | Blackish brown |
| 5 | 8.0 | C | 3.00 | A | Orange color |

Remark: type of destruction
G : rubber substrate is destructed
C : adhesive layer on the surface of rubber substrate is peeled off.
A : adhesive layer on the surface of polyvinyl chloride substrate is peeled off.

(—) : no appreciable color change is observed.

As clear from the above data, the controlled compositions not being susceptible to coloring shown only a poor adhesive force, and on the contrary, the controlled compositions showing a relatively strong adhesive force are susceptible to coloring. But, the adhesive compositions of the present invention show a strong adhesive force and, moreover, are not susceptible to coloring.

Experiment 2

The surface of a steel plate is sanded, washed with water, and then treated with trichloroethylene, followed by drying at 100°C. The above component (A)-(iii) prepared in Experiment [I]-(iii) is coated on the thus treated surface of the steel plate and dried at room temperature. The thus treated surface of the plate is further coated with the following rubber mixture, followed by heating at 140°C for 30 minutes under a pressure of 4 kg/cm² to allow a curing reaction to take place;

| Rubber mixture: | |
|---|---|
| Neoprene AD | 100 parts |
| Magnesium oxide | 4 parts |
| Stearic acid | 0.5 part |
| Carbon black | 58 parts |
| Process oil | 12 parts |
| Zinc oxide | 5 parts |
| Antioxidant | 0.5 part |

The resultant shows very tight and strong adhesive force between the steel plate and the rubber component.

Experiment 3

Each surface of two steel plates to be adhered to each other is mechanically roughed in a similar manner to that of Experiment (2). A mixture of the component (A)-(ii) and (A)-(iii) [component (A)-(ii) / component (A)-(iii) = 1:1 (weight)] is coated on the thus treated surfaces, and then the two plates are piled in such a manner that the two coated surfaces are contacted with each other, followed by heating at 130°C under pressure of 4 kg/cm² for 2 hours. The resultant shows satisfactory heat-resistance and very tight and strong adhesive force between the steel plates.

Experiment 4

To a 194 parts of ω,ω'-diisocyanato-1,3-dimethylcyclohexane kept at a temperature of 70°C is added dropwise over 30 minutes 16.6 parts of diglycerol under stirring, followed by allowing to react for further 3 hours at 75 to 80°C. Then, to the resulting reaction mixture is added 842 parts of ethyl acetate. This procedure gives a polyurethane polyisocyanate of solid content of 20% and an NCO content of 6.2%.

3 Parts of the thus prepared polyurethane polyisocyanate is admixed with 100 parts of the same component (B) as used in Experiment (1)-[II], followed by subjecting to the same adhesive force test as in Experiment (1)-[IV]. The peel strength of the above composition is 10.5 kg/25mm (25°C).

Experiment 5

The reaction product which is prepared by reacting 77.6 parts of ω,ω'-diisocyanato-1,3-dimethylcyclohexane with 10 parts of N-methyldiethanolamine is extracted with n-hexane to remove unreacted ω,ω'-diisocyanato-1,3-dimethylcyclohexane. 160 Parts of ethyl acetate is added to the extract to give a polyurethane polyisocyanate of a solid content of 20% and an NCO content of 3.1%.

15 Parts of the thus prepared polyurethane polyisocyanate is admixed with 100 parts of the same component (B) as used in Experiment (1)-[II]. The adhesive composition thus prepared shows a high peel strength by the same test as Experiment (1)-[IV].

Experiment 6

To 30 parts of polyester polyol having a molecular weight of about 20,000 which is prepared by reacting 0.5 mole of isophthalic acid and 0.5 mole of terephthalic acid with 0.52 mole of neopentylglycol and 0.51 mole of ethyleneglycol are added 35 parts of ethyl acetate and 35 parts of methyl ethyl ketone. To the resulting solution is added 10 parts of the component (A)-(i), and the resulting mixture is applied on the surface of aluminium foil in an amount 9.2 g/m², followed by keeping the foil standing at room temperature for 10 minutes to remove the solvent. The thus treated aluminium foil is piled on polyethyleneterephthalate film in such a manner that so-treated is contacted with the polyethyleneterephthalate film, followed by heating at 100°C for 30 minutes.

The peel strength of the resultant is 690 g/15mm(25°C).

The peel strength of the resultant which prepared by the same manner as the above procedure except that the polyester polyol solution is only used in place of the mixture of the polyester polyol and the component (A)-(i) is merely 45 g/15mm (25°C).

Experiment 7

Influence of a ratio of component (A) /component (B) upon the adhesive force is examined below.

The following adhesive compositions 1 to 5 are prepared by admixing the component (A)-(ii) in Experiment (1)-[I] with the component (B) in Experiment (1)-[II] in the ratios as listed in the following Table (V).

Adhesive forces of these compositions 1 to 5 are tested in the same manner as in Experiment (1)-[IV] to give the results as described in the Table (V).

Table (V)

| Adhesive composition | Component (part) | | Peel strength (kg/25 mm) | |
|---|---|---|---|---|
| | (A)-(ii) | (B) | 25°C | 80°C |
| 1 | 1 | 100 | 3.90 | — |
| 2 | 3 | 100 | 8.25 | 2.00 |
| 3 | 5 | 100 | 10.50 | 5.41 |
| 4 | 10 | 100 | 12.50 | 7.00 |
| 5 | 15 | 100 | 13.20 | 7.40 |

What we claim is:

1. An adhesive composition which comprises an NCO-terminated prepolymer prepared by reacting ω,ω'-diisocyanato-dimethylcyclohexane with an active hydrogen-containing compound having a molecular weight of about 60 to about 500 in a ratio of NCO groups to OH groups of not less than about 1.5 and a conjugated diene rubber, wherein the weight ratio of the NCO-terminated prepolymer to the rubber is about 1/10 to about 1/200.

2. An adhesive composition claimed in claim 1, wherein the ratio of the NCO-terminated prepolymer to the rubber is about 1/15 to about 1/100.

3. An adhesive composition claimed in claim 1, wherein the active hydrogen-containing compound is saturated or unsaturated glycol.

4. An adhesive composition claimed in claim 1 wherein the active hydrogen-containing compound is a polyol having 3 to 8 OH groups per molecule.

5. An adhesive composition claimed in claim 1, wherein the rubber is natural rubber.

6. An adhesive composition claimed in claim 1, wherein the rubber is a synthetic rubber.

7. An adhesive composition claimed in claim 6, wherein the synthetic rubber is a polymer or copolymer which is prepared by polymerization or copolymerization of a diene-type compound having a conjugated double bond and having 4 to 10 carbon atoms in its molecule.

8. An adhesive composition claimed in claim 7, wherein the diene compound is a member selected from the group consisting of a butadiene, isoprene and chloroprene.

9. An adhesive composition claimed in claim 7, wherein the monomer copolymerizable with the diene compound is that having a double bond and 4 to 16 carbon atoms per molecule.

10. An adhesive composition claimed in claim 9, wherein the monomer copolymerizable with the diene compound is a member selected from the group consisting of styrene, acrylonitrile, butylene and isobutylene.

11. An adhesive composition claimed in claim 10, wherein the molecular weight of synthetic rubber is about 20,000 to about 200,000.

12. An adhesive composition claimed in claim 6, wherein the synthetic rubber is a styrene-butadiene rubber.

13. An adhesive composition claimed in claim 6, wherein the synthetic rubber is a butadiene rubber.

14. An adhesive composition claimed in claim 6, wherein the synthetic rubber is a nitrile rubber.

15. An adhesive composition claimed in claim 6, wherein the synthetic rubber is a chloroprene rubber.

16. An adhesive composition claimed in claim 6, wherein the synthetic rubber is an isoprene rubber.

17. An adhesive composition claimed in claim 6, wherein the synthetic rubber is a butyl rubber.

* * * * *